US012741272B2

(12) United States Patent
Goto et al.

(10) Patent No.: US 12,741,272 B2
(45) Date of Patent: Sep. 22, 2026

(54) CARBON DIOXIDE PROCESSING AGENT AND METHOD FOR PRODUCING SAME

(71) Applicants: Eau De Merus Co., Ltd., Hiroshima (JP); Yoshitaka Goto, Hiroshima (JP)

(72) Inventors: Yoshitaka Goto, Hiroshima (JP); Hideki Aoki, Hiroshima (JP); Hidehiro Kokubun, Tokyo (JP); Yoshinobu Sugiyama, Aichi (JP); Masahiro Kojima, Kanagawa (JP)

(73) Assignees: Yoshitaka Goto, Hiroshima (JP); Eau De Merus Co., Ltd., Hiroshima (JP)

( * ) Notice: Subject to any disclaimer, the term of this patent is extended or adjusted under 35 U.S.C. 154(b) by 484 days.

(21) Appl. No.: 18/559,307

(22) PCT Filed: Apr. 28, 2022

(86) PCT No.: PCT/JP2022/019433
§ 371 (c)(1),
(2) Date: Nov. 6, 2023

(87) PCT Pub. No.: WO2022/234833
PCT Pub. Date: Nov. 10, 2022

(65) Prior Publication Data

US 2024/0226856 A1 Jul. 11, 2024

(30) Foreign Application Priority Data

May 7, 2021 (JP) ................................ 2021-079211

(51) Int. Cl.
*B01J 23/78* (2006.01)
*B01D 53/62* (2006.01)
*B01D 53/81* (2006.01)
*B01J 21/12* (2006.01)
*B01J 21/18* (2006.01)
*B01J 29/072* (2006.01)
*B01J 37/02* (2006.01)

(52) U.S. Cl.
CPC .............. *B01J 23/78* (2013.01); *B01D 53/62* (2013.01); *B01D 53/81* (2013.01); *B01J 21/12* (2013.01); *B01J 21/18* (2013.01); *B01J 29/072* (2013.01); *B01J 37/0221* (2013.01); *B01J 37/0236* (2013.01); *B01D 2251/402* (2013.01); *B01D 2251/404* (2013.01); *B01D 2257/504* (2013.01)

(58) Field of Classification Search
CPC ........ B01D 53/62; B01D 53/81; B01D 53/82; B01D 2251/402; B01D 2251/404; B01D 2253/108; B01D 2253/1124; B01D 2253/304; B01D 2257/504; B01J 20/04; B01J 20/06; B01J 20/16; B01J 21/12; B01J 21/18; B01J 23/78; B01J 29/072; B01J 37/0221; B01J 37/0236; C01G 49/08

See application file for complete search history.

(56) References Cited

U.S. PATENT DOCUMENTS

| | | | |
|---|---|---|---|
| 4,912,070 | A | 3/1990 | Mitani |
| 2012/0048111 | A1 | 3/2012 | Nakao et al. |
| 2014/0099245 | A1 | 4/2014 | Hamad |

FOREIGN PATENT DOCUMENTS

| | | | |
|---|---|---|---|
| CN | 102413920 | A | 4/2012 |
| JP | H03-257026 | A | 11/1991 |
| JP | H05-163023 | A | 6/1993 |
| JP | 2007-083159 | A | 4/2007 |
| JP | 2016-215181 | A | 12/2016 |
| JP | 2013-010653 | A | 1/2023 |
| KR | 2014-0013293 | A | 2/2014 |
| WO | 2022/234833 | A1 | 11/2022 |

OTHER PUBLICATIONS

Zhang, H.T., Zhang, X., Sun, X.Z. & Ma, Y.W., 2013, Shape-controlled synthesis of nanocarbons through direct conversion of carbon dioxide. Sci. Rep. 3, 3534; DOI:10.1038/srep03534 (Year: 2013).*

Zhang, C., et al., 2000, Materials Chemistry and Physics, 62, 52-61. (Year: 2000).*

Kumar et al., A comparative study of CO2 sorption properties for different oxides, Materials for Renewable and Sustainable Energy, vol. 3, Iss. 30, 2014, pp. 1-15.

Tamaura, Decomposition of CO2 and Methanation using Magnetite, Japan TAPPI Journal, 45(5), 540-547, 1991.

Younas, et al., Feasibility of CO2 adsorption by solid adsorbents: a review on low-temperature systems, International Journal of Environmental Science and Technology, 13(7), 2016, pp. 1839-1860.

International search report and written opinion, mailed Jun. 21, 2022, for international application PCT/JP2022/019433 filed on Apr. 28, 2022.

Extended European Search Report for EP application No. 22798937.3, Dated Sep. 2, 2024, in 11 pages.

Office Action, dated May 30, 2025, issued in corresponding Chinese Patent Application Serial No. 202280033351.5 (original and English translation enclosed).

* cited by examiner

*Primary Examiner* — Brian A Mccaig
(74) *Attorney, Agent, or Firm* — K&L Gates LLP; Brian J. Novak; Giorgios N. Kefallinos

(57) ABSTRACT

Provided are: a carbon dioxide processing agent capable of fixing and decomposing carbon dioxide without the need for a heat treatment; and a method of producing a carbon dioxide processing agent, by which a carbon dioxide processing agent containing an oxygen-deficient magnetite can be produced without the need for a heat treatment in a hydrogen gas atmosphere. The carbon dioxide processing agent contains a magnesium oxide, an oxygen-deficient magnetite, and a zeolite. The method of producing a carbon dioxide processing agent includes the steps of: mixing and stirring a magnetite and a zeolite to obtain a mixed powder in which pores of the zeolite are filled with the magnetite; adding water to the mixed powder to obtain a mixture; and adhering a fine powder of magnesium oxide to the mixture and drying the resultant.

9 Claims, No Drawings

CARBON DIOXIDE PROCESSING AGENT AND METHOD FOR PRODUCING SAME

CROSS REFERENCE TO RELATED APPLICATIONS

This application is a national phase filing of PCT/JP2022/019433, filed on Apr. 28, 2022, which claims priority to Japanese Patent Application Number 2021-079211, filed on May 7, 2021, the disclosures each of which are incorporated herein by reference in their entirety.

TECHNICAL FIELD

The present disclosure relates to a carbon dioxide processing agent, and a method of producing the same.

BACKGROUND ART

The causes of global warming include an increase in the carbon dioxide emissions from facilities using fossil fuels, such as power plants and factories, as well as automobiles. While the utilization of renewable energy has been promoted for reduction of the carbon dioxide emissions, circumstances where fossil fuels have to be used are still expected to remain. For this reason, it is desired to develop technologies for decomposition/removal and fixation of emitted carbon dioxide.

As technologies for decomposition/removal and fixation of carbon dioxide, various methods have been proposed, including semiconductor photocatalysis methods, photochemical reduction methods using a metal colloidal catalyst, a metal complex, an enzyme, or the like, electrochemical reduction methods, and chemical fixation-conversion methods. In addition, methods of decomposing carbon dioxide using an oxygen-deficient magnetite have been proposed (for example, Patent Literature 1 and Non Patent Literature 1). According to Patent Literature 1 and Non Patent Literature 1, carbon dioxide can be decomposed into carbon by heating in the presence of an oxygen-deficient magnetite.

CITATION LIST

Patent Literature

Patent Literature 1: Unexamined Japanese Patent Application Publication No. H05-163023

Non Patent Literature

Non Patent Literature 1: Yutaka Tamaura, "Decomposition of $CO_2$ and Methanation using Magnetite", Japan TAPPI Journal, 45(5), 540-547, 1991

SUMMARY OF INVENTION

Technical Problem

As described in Patent Literature 1 and Non Patent Literature 1, a method of decomposing carbon dioxide using an oxygen-deficient magnetite can be carried out in a relatively low temperature environment; however, the method requires a thermal energy of 150° C. or higher, preferably 250° C. or higher.

Further, it is necessary to prepare the oxygen-deficient magnetite and, in order to obtain the oxygen-deficient magnetite from magnetite, it is required to perform a heat treatment of magnetite at 290° ° C. or higher in a hydrogen gas atmosphere.

The present disclosure was made in view of the above-described matters, and an object of the present disclosure is to provide: a carbon dioxide processing agent capable of fixing and decomposing carbon dioxide without the need for a heat treatment; and a method of producing a carbon dioxide processing agent, by which a carbon dioxide processing agent containing an oxygen-deficient magnetite can be produced without the need for a heat treatment in a hydrogen gas atmosphere.

Solution to Problem

The carbon dioxide processing agent according to a first aspect of the present disclosure is characterized by containing a magnesium oxide, an oxygen-deficient magnetite, and a zeolite.

It is preferred that, with respect to a total amount of the magnesium oxide, the oxygen-deficient magnetite, and the zeolite, the content of the magnesium oxide be 3 to 75% by weight, the content of the oxygen-deficient magnetite be 10 to 90% by weight, and the content of the zeolite be 0.1 to 20% by weight.

It is also preferred that, with respect to a total amount of the magnesium oxide, the oxygen-deficient magnetite, and the zeolite, the content of the magnesium oxide be 40 to 60% by weight, the content of the oxygen-deficient magnetite be 25 to 55% by weight, and the content of the zeolite be 1 to 17% by weight.

The carbon dioxide processing agent preferably contains a carbon powder in an amount of 3 to 20% by weight.

Further, the carbon dioxide processing agent preferably contains a calcium compound powder in an amount of 3 to 20% by weight.

Still further, the carbon dioxide processing agent preferably contains an aluminum powder in an amount of 3 to 20% by weight.

Yet still further, the carbon dioxide processing agent preferably contains a silicon powder in an amount of 3 to 20% by weight.

Yet still further, it is preferred that the carbon dioxide processing agent contain an aluminum silicate, and that a weight ratio between a total amount of the magnesium oxide, the oxygen-deficient magnetite, and the zeolite, and the amount of the aluminum silicate be 99.1:0.1 to 65:35.

The method of producing a carbon dioxide processing agent according to a second aspect of the present disclosure is characterized by including the steps of:

mixing and stirring a magnetite and a zeolite to obtain a mixed powder in which pores of the zeolite are filled with the magnetite;

adding water to the mixed powder to obtain a mixture; and adhering a fine powder of magnesium oxide to the mixture and drying the resultant.

Advantageous Effects of Invention

According to the present disclosure, the following can be provided: a carbon dioxide processing agent capable of fixing and decomposing carbon dioxide without the need for a heat treatment; and a method of producing a carbon dioxide processing agent, by which a carbon dioxide processing agent containing an oxygen-deficient magnetite can be produced without the need for a heat treatment in a hydrogen gas atmosphere.

DESCRIPTION OF EMBODIMENTS

Carbon Dioxide Processing Agent

The carbon dioxide processing agent contains a magnesium oxide, an oxygen-deficient magnetite, and a zeolite. In the carbon dioxide processing agent, not only the oxygen-deficient magnetite is incorporated and bound to pores of the zeolite that is porous but also the magnesium oxide is adhered to the pores of the zeolite. Carbon dioxide is efficiently adsorbed and captured mainly by the magnesium oxide, and the captured carbon dioxide is decomposed by the oxygen-deficient magnetite, as a result of which oxygen is released. The carbon dioxide processing agent is capable of decomposing carbon dioxide to release oxygen even at normal temperature; therefore, a heat treatment does not have to be performed.

With respect to a total amount of the magnesium oxide, the oxygen-deficient magnetite, and the zeolite, the content of the magnesium oxide is 3 to 75% by weight, preferably 20 to 60% by weight, more preferably 40 to 60% by weight. When the content of the magnesium oxide is excessively low, adsorption and capture of carbon dioxide are hardly facilitated. On the other hand, when the content of the magnesium oxide is excessively high, since this makes the content of the oxygen-deficient magnetite relatively low, decomposition of carbon dioxide hardly proceeds.

With respect to a total amount of the magnesium oxide, the oxygen-deficient magnetite, and the zeolite, the content of the oxygen-deficient magnetite is 10 to 90% by weight, preferably 25 to 70% by weight, more preferably 25 to 55% by weight.

With respect to a total amount of the magnesium oxide, the oxygen-deficient magnetite, and the zeolite, the content of the zeolite is 0.1 to 20% by weight, preferably 1 to 17% by weight, more preferably 1 to 15% by weight.

The zeolite may be of LTA-type, FAU-type, or the like, and is not particularly limited; however, structurally, a small-pore LTA-type zeolite having an eight-membered-ring pore entrance is desirable. In terms of the kind of the zeolite, examples of the zeolite include amicite, analcime, and barrerite, and a zeolite having a hexagonal, orthorhombic, cubic, or tetragonal crystal structure is desirable. Specific examples of such a zeolite include analcime, hsianghualite, paulingite, bellbergite, edingtonite, erionite, faujasite, and garronite.

Other Components

The carbon dioxide processing agent may also contain other components in addition to the above-described components. For example, the carbon dioxide processing agent may contain a carbon powder and a calcium compound powder, and the content of each of these components is 3 to 20% by weight.

Further, the carbon dioxide processing agent may contain an aluminum powder, a silicon powder, and the like. The content of each of these components in the carbon dioxide processing agent is preferably 0.1 to 20% by weight, more preferably 3 to 20% by weight, still more preferably 3 to 5% by weight, most preferably 4 to 5% by weight. When the carbon dioxide processing agent contains a component that includes aluminum and silicon, the component may be an amorphous aluminum silicate in which a ratio of silicon is 0.7 to 1, taking the amount of aluminum as 1. Such an amorphous aluminum silicate is widely known as a carbon dioxide adsorbent. When the carbon dioxide processing agent contains an aluminum silicate, a weight ratio between a total amount of the magnesium oxide, the oxygen-deficient magnetite, and the zeolite, and the amount of the aluminum silicate is preferably 99.1:0.1 to 65:35, more preferably 97:3 to 75:25.

Method of Producing Carbon Dioxide Processing Agent

A carbon dioxide processing agent can be produced, for example, in the following manner.

Step 1

A zeolite and a magnetite are mixed, and a mechanical energy is applied to the resulting mixture such that the magnetite is incorporated into fine pores of the zeolite. The mechanical energy may be applied by, for example, adding the zeolite and the magnetite to a stirring vessel having a hemispherical bottom and a cylindrical body, and rotating this vessel about multiple axes, in other words, in such a manner that the vessel is rotated about one axis and this axis is rotated at the same time. Specifically, an apparatus such as a planetary centrifugal stirrer, a planetary centrifugal mixer, a planetary stirrer, or a stirring deaerator may be employed. By material convention and shear stress that are caused by a centrifugal force generated in the apparatus, the zeolite and the magnetite are mixed, and a high mechanical energy is applied thereto. As a result, the magnetite is incorporated into pores of the zeolite. This step is desirably performed with the relative humidity in the vessel being set at about 50% (±5%).

Step 2

Water is added to a mixed powder obtained in the step 1. Dried zeolites absorbs water to generate heat, and zeolites have a fine structure and partially generate a large amount of heat in the region of the fine structure. In addition, zeolites generate hydrogen when immersed in water. By this mechanism of heat generation and hydrogen generation, the magnetite incorporated into the zeolite is converted into oxygen-deficient magnetite. It is noted here that water may be added to the mixed powder in an amount of 40 to 60% by weight, preferably about 50% by weight.

Step 3

A magnesium oxide is adhered to a mixture obtained in the step 2. This may be performed by any method as long as the magnesium oxide can be uniformly adhered to the mixture and, for example, powder of the magnesium oxide may be sprinkled over the mixture obtained by adding water to the mixed powder in the step 2 and subsequently spreading the resultant in a planar form. The powder of the magnesium oxide is preferably in the form of fine powder and, for example, the average particle size thereof is 20 μm or less, preferably 10 μm or less.

Step 4

Subsequently, the mixture is dried in a state where the magnesium oxide is adhered thereto. This drying may be performed by heating; however, it can be performed by air-drying as well. A carbon dioxide processing agent can be produced in the above-described manner.

The method of producing a carbon dioxide processing agent according to the present embodiment can yield a carbon dioxide processing agent containing an oxygen-deficient magnetite even at normal temperature; therefore, this method does not require a heat treatment in a hydrogen gas atmosphere as in conventional methods, and is thus excellent in production cost.

The thus obtained carbon dioxide processing agent may be pulverized to be used in a particulate or powder form. The carbon dioxide processing agent can be used by itself, or may be mixed into or applied to a substrate or material. Examples of the substrate or material include, but not limited to: road materials such as asphalt, lacquers such as paints, coating materials, colorants, adhesives, cements, building materials, exterior materials, interior materials, and ceiling materials.

In a case of obtaining a carbon dioxide processing agent that contains the above-described other components, such as carbon, a calcium compound, aluminum, silicon, and an aluminum silicate, powders of these components may be added along with the powder of the magnesium oxide in the above-described step 3, or may be added and mixed after the adhesion and drying of the powder of the magnesium oxide in the step 3. The amount of each component to be blended conforms to that of the above-described carbon dioxide processing agent (the amount of the magnetite to be mixed conforms to the amount of the oxygen-deficient magnetite to be blended).

EXAMPLES

Experiment 1

Samples (sample Nos. 1 to 23) were produced by blending a magnesium oxide, a magnetite, and a zeolite at the respective blending ratios shown in Table 1.

The samples were each produced as follows.

A zeolite and a magnetite were added to a stirring vessel having a hemispherical bottom and a cylindrical body. This stirring vessel was set on a planetary centrifugal stirrer to perform stirring. It is noted here that this stirring was performed with the relative humidity in the vessel being set at 50%.

Water was added to the resulting mixed powder (weight ratio of water with respect to mixed powder=50%), and the resultant was stirred to obtain a mixture spread in a planar form.

A magnesium oxide was evenly placed in a rectangular parallelepiped vessel. It is noted here that the bottom of this vessel had holes of about 0.5 mm in diameter at equal intervals, and an aluminum shield plate was arranged on this bottom. This vessel containing the magnesium oxide was placed on the mixture spread in a planar form. Subsequently, the shield plate was removed, and powder of the magnesium oxide was uniformly sprinkled over the mixture while horizontally shuffling the shield plate front-to-back and side-to-side.

After sprinkling the powder of the magnesium oxide, the resultant was dried in this state to produce each sample.

For each of the thus produced samples, an experiment was conducted to examine the decomposition of carbon dioxide and the generation of oxygen. The experiment was conducted in the following manner.

A sample (300 g) was placed in a test tray, and 300 mL of distilled water was added thereto and stirred.

After putting this test tray into a bag and tightly sealing the bag, certain amounts of carbon monoxide and carbon dioxide were sequentially injected thereto through a gas inlet. Thereafter, the carbon dioxide concentration, the carbon monoxide concentration, and the oxygen concentration in the bag were measured using an infrared absorption-type carbon dioxide concentration meter, a non-dispersive infrared absorption-type carbon monoxide concentration meter, and a zirconia-type oxygen concentration meter, respectively.

The initial concentrations of carbon dioxide, oxygen, and carbon monoxide in the bag were as follows.

Initial concentration of carbon dioxide: 21,400 ppm

Initial concentration of oxygen: 129,700 ppm

Initial concentration of carbon monoxide: 32 ppm

The bag was left to stand for 24 hours. The carbon dioxide concentration, the oxygen concentration, and the carbon monoxide concentration in the bag after the 24 hours were measured in the same manner as described above. The concentrations of the respective gases in the bag after the 24 hours are shown in Table 1.

TABLE 1

| | Sample blending ratio | | | Gas concentration | | |
|---|---|---|---|---|---|---|
| Sample No. | Magnesium oxide (% by weight) | Magnetite (% by weight) | Zeolite (% by weight) | Carbon dioxide (ppm) | Oxygen (ppm) | Carbon monoxide (ppm) |
| 1 | 3 | 80 | 17 | 21000 | 129700 | 32 |
| 2 | 5 | 78 | 17 | 21000 | 129700 | 32 |
| 3 | 20 | 63 | 17 | 21000 | 129700 | 32 |
| 4 | 70 | 13 | 17 | 15000 | 129700 | 32 |
| 5 | 30 | 53 | 17 | 21000 | 129800 | 31 |
| 6 | 40 | 43 | 17 | 18000 | 129700 | 32 |
| 7 | 50 | 33 | 17 | 14000 | 129800 | 31 |
| 8 | 60 | 23 | 17 | 14000 | 129700 | 32 |
| 9 | 30 | 62 | 8 | 21000 | 129700 | 32 |
| 10 | 30 | 57 | 13 | 21000 | 129700 | 32 |
| 11 | 40 | 52 | 8 | 18000 | 129700 | 32 |
| 12 | 40 | 47 | 13 | 18000 | 130000 | 32 |
| 13 | 50 | 42 | 8 | 14000 | 130000 | 32 |
| 14 | 50 | 37 | 13 | 13360 | 130000 | 32 |
| 15 | 60 | 32 | 8 | 13300 | 131000 | 31 |
| 16 | 60 | 27 | 13 | 13300 | 130000 | 31 |
| 17 | 60 | 34 | 6 | 13300 | 129700 | 31 |
| 18 | 60 | 36 | 4 | 13300 | 129700 | 31 |
| 19 | 60 | 38 | 2 | 13300 | 130000 | 31 |
| 20 | 59 | 40 | 1 | 13290 | 130000 | 31 |
| 21 | 57 | 42 | 1 | 13280 | 129700 | 31 |
| 22 | 55 | 44 | 1 | 13270 | 129700 | 31 |
| 23 | 53 | 46 | 1 | 13270 | 129800 | 31 |

A reduction in the carbon dioxide concentration was observed for all of the samples. Particularly, a large reduction in the carbon dioxide concentration was observed for those samples in which the magnesium oxide content was 40% by weight or more (sample Nos. 4, 6, 7, 8, and 11 to 23).

In addition, an increase in the oxygen concentration was observed for the sample Nos. 5, 7, 12 to 16, 19, 20, and 23. Particularly, the amount of the increase was large for the sample Nos. 12 to 16, 19, and 20. Although the results appear to be variable, generally, those samples that were obtained at a blending ratio of 40 to 60% by weight of magnesium oxide, 32 to 47% by weight of magnetite, and 1 to 13% by weight of zeolite are considered to have a high effect of decomposing carbon dioxide to generate oxygen.

It is seen that an increase in the carbon monoxide concentration was observed for none of the samples, and that oxygen was generated without decomposition of carbon dioxide into carbon monoxide.

In this manner, it was possible to provide a carbon dioxide processing agent that fixes and decomposes carbon dioxide to generate oxygen even when the carbon dioxide processing agent and carbon dioxide are allowed to intervene with each other in a normal temperature environment, and this carbon dioxide processing agent was produced at normal temperature; therefore, it was demonstrated that a carbon dioxide processing agent containing an oxygen-deficient magnetite can be produced without the need for a heat treatment in a hydrogen gas atmosphere.

Experiment 2

An aluminum silicate was added to the sample containing 60% by weight of a magnesium oxide, 32% by weight of a magnetite, and 8% by weight of a zeolite (sample No. 15 of Experiment 1), and the effects of this addition were examined.

The sample No. 15 and the aluminum silicate were blended at the respective blending ratios shown in Table 2 and 3 to prepare samples (sample Nos. 31 to 74).

Subsequently, an experiment was conducted to examine the decomposition of carbon dioxide and the generation of oxygen in the same manner as in Experiment 1. The concentrations of the respective gases in the bag after 24 hours are shown in Tables 2 and 3. The initial concentrations of carbon dioxide, oxygen, and carbon monoxide in the bag were as follows.

Initial concentration of carbon dioxide: 21,400 ppm

Initial concentration of oxygen: 129,700 ppm

Initial concentration of carbon monoxide: 32 ppm

TABLE 2

| | Sample blending ratio | | Gas concentration | | |
|---|---|---|---|---|---|
| Sample No. | Sample No. 15 (% by weight) | Aluminum silicate (% by weight) | Carbon dioxide (ppm) | Oxygen (ppm) | Carbon monoxide (ppm) |
| 31 | 99.9 | 0.1 | 13400 | 130900 | 31 |
| 32 | 99.8 | 0.2 | 13380 | 130800 | 31 |
| 33 | 99.7 | 0.3 | 13380 | 130900 | 31 |
| 34 | 99.6 | 0.4 | 13360 | 130900 | 31 |
| 35 | 99.5 | 0.5 | 13370 | 130700 | 31 |
| 36 | 99.4 | 0.6 | 13360 | 130600 | 31 |
| 37 | 99.3 | 0.7 | 13380 | 130800 | 31 |
| 38 | 99.2 | 0.8 | 13380 | 130700 | 31 |
| 39 | 99.1 | 0.9 | 13360 | 130900 | 31 |
| 40 | 99 | 1 | 13360 | 130900 | 31 |
| 41 | 98 | 2 | 13350 | 130900 | 31 |
| 42 | 97 | 3 | 13340 | 131000 | 31 |
| 43 | 96 | 4 | 13320 | 131000 | 31 |
| 44 | 95 | 5 | 13310 | 131000 | 31 |
| 45 | 94 | 6 | 13300 | 131000 | 31 |

TABLE 3

| | Sample blending ratio | | Gas concentration | | |
|---|---|---|---|---|---|
| Sample No. | Sample No. 15 (% by weight) | Aluminum silicate (% by weight) | Carbon dioxide (ppm) | Oxygen (ppm) | Carbon monoxide (ppm) |
| 46 | 93 | 7 | 13300 | 131000 | 31 |
| 47 | 92 | 8 | 13310 | 131000 | 31 |
| 48 | 91 | 9 | 13310 | 130900 | 31 |
| 49 | 90 | 10 | 13320 | 130900 | 31 |
| 50 | 89 | 11 | 13330 | 130800 | 31 |
| 51 | 88 | 12 | 13320 | 130900 | 31 |
| 52 | 87 | 13 | 13300 | 130900 | 32 |
| 53 | 86 | 14 | 13300 | 130800 | 32 |
| 54 | 85 | 15 | 13310 | 130800 | 32 |
| 55 | 84 | 16 | 13320 | 130800 | 31 |
| 56 | 83 | 17 | 13300 | 130900 | 31 |
| 57 | 82 | 18 | 13360 | 131000 | 31 |
| 58 | 81 | 19 | 13300 | 131000 | 31 |

TABLE 3-continued

| | Sample blending ratio | | Gas concentration | | |
|---|---|---|---|---|---|
| Sample No. | Sample No. 15 (% by weight) | Aluminum silicate (% by weight) | Carbon dioxide (ppm) | Oxygen (ppm) | Carbon monoxide (ppm) |
| 59 | 80 | 20 | 13350 | 130900 | 32 |
| 60 | 79 | 21 | 13350 | 130800 | 32 |
| 61 | 78 | 22 | 13360 | 130700 | 32 |
| 62 | 77 | 23 | 13370 | 130600 | 31 |
| 63 | 76 | 24 | 13380 | 130500 | 31 |
| 64 | 75 | 25 | 13400 | 131000 | 31 |
| 65 | 74 | 26 | 14100 | 130600 | 32 |
| 66 | 73 | 27 | 14200 | 130500 | 32 |
| 67 | 72 | 28 | 14000 | 130400 | 31 |
| 68 | 71 | 29 | 14000 | 130500 | 31 |
| 69 | 70 | 30 | 14100 | 130300 | 31 |
| 70 | 69 | 31 | 14200 | 130500 | 32 |
| 71 | 68 | 32 | 14300 | 130600 | 32 |
| 72 | 67 | 33 | 14400 | 130400 | 31 |
| 73 | 66 | 34 | 14400 | 130300 | 32 |
| 74 | 65 | 35 | 14300 | 130200 | 31 |

The carbon dioxide concentration was largely reduced while the oxygen concentration was increased for all of the samples (sample Nos. 31 to 74). Particularly, the increase in the oxygen concentration was generally large for the sample Nos. 42 to 64, and it is seen that the aluminum silicate content is particularly preferably 3 to 25% by weight. It is also seen that an increase in the carbon monoxide concentration was observed for none of the samples, and oxygen was generated without decomposition of carbon dioxide into carbon monoxide.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2021-079211, filed on May 7, 2021, the entire disclosure of which is incorporated by reference herein.

The invention claimed is:

1. A carbon dioxide processing agent, comprising:

a magnesium oxide;

an oxygen-deficient magnetite; and a zeolite.

2. The carbon dioxide processing agent according to claim 1, wherein, with respect to a total amount of the magnesium oxide, the oxygen-deficient magnetite, and the zeolite, a content of the magnesium oxide is 3 to 75% by weight, a content of the oxygen-deficient magnetite is 10 to 90% by weight, and a content of the zeolite is 0.1 to 20% by weight.

3. The carbon dioxide processing agent according to claim 2, wherein, with respect to the total amount of the magnesium oxide, the oxygen-deficient magnetite, and the zeolite, the content of the magnesium oxide is 40 to 60% by weight, the content of the oxygen-deficient magnetite is 25 to 55% by weight, and the content of the zeolite is 1 to 17% by weight.

4. The carbon dioxide processing agent according to claim 3, further comprising a carbon powder in an amount of 3 to 20% by weight.

5. The carbon dioxide processing agent according to claim 3, further comprising a calcium compound powder in an amount of 3 to 20% by weight.

6. The carbon dioxide processing agent according to claim 3, further comprising an aluminum powder in an amount of 3 to 20% by weight.

7. The carbon dioxide processing agent according to claim 3, further comprising a silicon powder in an amount of 3 to 20% by weight.

8. The carbon dioxide processing agent according to claim 3, further comprising an aluminum silicate, wherein a weight ratio between the total amount of the magnesium oxide, the oxygen-deficient magnetite, and the zeolite, and an amount of the aluminum silicate is 99.1:0.1 to 65:35.

9. A method of producing a carbon dioxide processing agent, the method comprising the steps of:

mixing and stirring a magnetite and a zeolite to obtain a mixed powder in which pores of the zeolite are filled with the magnetite;

adding water to the mixed powder to obtain a mixture; and adhering a fine powder of magnesium oxide to the mixture thereby forming a resultant and drying the resultant.

* * * * *